Patented Jan. 8, 1946

2,392,390

UNITED STATES PATENT OFFICE 2,392,390

TREATMENT OF VEGETABLE OILS

Percy L. Julian, Maywood, and Herbert T. Iveson, Chicago, Ill., assignors to The Glidden Company, Cleveland, Ohio, a corporation of Ohio No Drawing. Application July 15, 1942, Serial No. 451,010

11 Claims. (Cl. 260—424)

The present invention relates to the treatment of vegetable oils, such as soybean oil, particularly to the production of light-colored, non-break oils.

It is known that when oils, such as soybean oil, are heated that a dark colored precipitate is formed known as "break." This is undesirable and a wet alkali refining is customarily employed to produce a non-break oil. When a batch alkali refining is employed it is necessary that the reaction mixture be allowed to stand to permit settling of the sludge. In a continuous process accurate proportionating devices must be employed and the times and temperature must be rather accurately controlled. In both processes, of course, soap is formed and since water is present there is always the problem presented by emulsification of some oil with resulting loss of the oil so emulsified. This alkali refining while retarding the formation of "break" at the temperatures ordinarily employed in the use of the oil does not produce an oil of materially lighter color and it is customary to bleach the alkali refined oil.

It is accordingly an object of the present invention to provide an improved process for producing a light-colored non-break oil.

Another object is to provide a substantially dry process for accomplishing the foregoing.

Other and ancillary objects will appear from the description as it proceeds.

It has been found that the objects of the present invention may be accomplished if the oil, such as soybean oil, is first treated with an acid clay, and then after removal of the acid clay the oil is treated with an alkaline clay at a pH above about 8. It is important that this order be observed as the results are not attained if the oil is first treated with an alkaline clay and then with the acid clay. It is also important that the acid clay be removed before the alkaline clay is added as the results are not attained if the acid clay is present when the alkaline clay is added.

Also if phosphatides are present in the oil they are preferably removed after the acid clay treatment. By having them present during the acid clay treatment step much lighter colored phosphatides are produced and their presence at this stage does not seem to interfere with the quality of the oil produced. For best results, however, the phosphatides should be removed prior to the treatment with the alkaline clay. It is also desirable to remove as much as possible of any water which is present prior to the alkaline treatment. Some water may, of course, be present in the oil prior to the alkaline treatment and, in fact, the addition of small quantities of water to emulsify the phosphatides in the oil is desirable, since it can conveniently be removed in the emulsion.

The pH of the acid clay should be about 5 to 3. Above a pH of 5 there is insufficient bleaching, if any, and below 3 there is some danger of hydrolysis. In the case of the alkaline clay the pH should be greater than 8 and pH values much above 10 are to be avoided. It is not necessary, however, that the alkaline clay as added have a pH above 8, as the desired results may be obtained by adding dry alkali in addition to the alkaline clay. Thus in one instance 2% of a fuller's earth having a pH of 8 was ineffective to produce a non-break oil, but upon the addition of 0.05% of sodium carbonate based on the weight of the oil, an amount sufficient to raise the pH of the clay to 10.1, a non-break oil was produced. The alkali may be either added to the clay as a mixture or the alkaline clay may be treated with the alkali to bring its pH to the desired value. It is important, however, that the clay be alkaline as a dry mixture of acid clay and alkali, even in amount sufficient to produce the desired pH is not suitable.

When treating solvent extracted soybean oil it has been found convenient to treat the miscella, which is composed of solvent, oils and some meal fines which is obtained on extraction of soybean meal. The miscella-clay mixture is then filtered, after which a small amount of water is added to emulsify the phosphatides and the emulsion separated from the bulk of the oil. The phosphatides are then recovered from the emulsion, and when so recovered are found to be much lighter in color than when the acid clay treatment is omitted. In fact, the phosphatides produced by the present invention are lighter in color than the phosphatides recovered in the ordinary way after a single bleach with hydrogen peroxide, and in many cases are as light or lighter than double bleached phosphatides.

The thus clarified oil is then treated with the alkaline clay and again centrifuged or filtered to remove the alkaline clay together with the so-called "break" material. Oil so produced is very light in color and is non-break at 600° F.

The following examples are given by way of illustration in order that those skilled in the art may better practice the invention and they represent preferred modes of carrying out the invention.

EXAMPLE I

Miscella obtained from the extraction of soybeans with a hydrocarbon solvent was treated with 1.5% by weight of the oil of a calcined acid clay having a pH of 4.00 and 0.5% by weight of the oil of an acid washed clay having a pH of 4.40 at 220–240° F. for 10 minutes and filtered. The solvent was then removed, 3% of water added and the phosphatides emulsified. The emulsion was then separated from the bulk of the oil by centrifuging, separating oil, and drying the emulsion in vacuum. The oil was then treated with 2% by weight of the oil of an alkaline fuller's earth having a pH of 8.00 and 0.05% of sodium carbonate by weight of the oil for 10 minutes at 220–240° F. after which the oil was again filtered. A blank was run and the color of the treated oil and treated phosphatide compared with the blank. The treated oil was non-break at 600° F. while the blank was a "break" oil. Table I gives the results of the color comparisons, the values given being Lovibond. The percent of moisture in the finished treated oil was between 0.05 and 0.1%.

Table I

| Material | Color of phosphatide | | Color of oil | | Quality |
|---|---|---|---|---|---|
| | Red | Yellow | Red | Yellow | |
| Untreated | 2.0 | 46 | 5.2 | 36 | Break. |
| Treated | 1.0 | 4.0 | 0.7 | 7 | Non-break. |

In place of the mixture of acid clays either of the clays may be used alone, or other acid clays may be used provided their pH is less than 5.

EXAMPLE II

Phosphatide free soybean oil having a color of 5-red and 36-yellow was treated at 220–240° F. for 10 minutes with the same mixture of acid clays as used in Example I. The oil was then filtered and the filtered oil heated with 2% by weight of the oil of a fuller's earth having a pH of 8.40 at 220–240° F. for 10 minutes and again filtered. The treated oil was non-break at 600° F. and had a color of red 0.3 and yellow 2.5 Lovibond.

EXAMPLE III

Miscella was treated as it came from the extraction towers in the commercial extraction of the oil from soybeans with hexane. A large holding tank was allowed to fill up to about ¼ full with miscella and 12# of a calcined acid clay having a pH of 4.0 and 4# of an acid washed clay having a pH of 4.4 was then added and the tank allowed to fill up with miscella. This required from about 8 to 10 minutes during which time the mixture was agitated. The tank was then allowed to empty until it was about one-half full. The miscella-clay mixture was filtered through a press and sent to a still to be concentrated. Other batches of calcined acid clay and acid washed clay were then added and the tank allowed to fill up again, the process being repeated. This procedure was necessary in order to take care of the continuous flow of miscella from the extraction towers. The batches of clay mentioned above were added every twenty minutes and were calculated to be 1.5% of the calcined acid clay and 0.5% of the acid washed clay on the weight of the oil in the miscella.

The miscella was then concentrated. The last traces of hexane were removed by the treatment with superheated steam, which also emulsified the phosphatides present in the oil. The mixture of oil and phosphatide emulsion was then centrifuged to remove the emulsion. The resulting oil was centrifuged a second time to remove excess moisture and heated to 220° to 240° F. 2% of an alkaline fuller's earth having a pH of 8.0 and 0.05% of sodium carbonate was then added and the mixture stirred for ten minutes after which it was filtered. The phosphatide emulsion was dried under vacuum.

A simultaneous run was made under the same conditions except that no clay treatments were employed. A comparison between the two oils and the phosphatides produced is shown in Table II.

Table II

| Material | Color of phosphatides | | Color of oil | | Quality |
|---|---|---|---|---|---|
| | Red | Yellow | Red | Yellow | |
| Untreated | 2.6 | 20 | 4.3 | 22 | Break. |
| Treated | 1.1 | 7 | 0.8 | 6 | Non-break. |

There have been many complicated procedures proposed for producing non-break oil but it is readily seen that the sequence of steps outlined provides a simple procedure for producing a non-break oil and at the same time a very light oil is produced. Also a light colored phosphatide is produced when starting with phosphatide containing miscella.

Having described the invention what is claimed is:

1. The process of producing non-break vegetable oil which comprises first treating the oil with acid clay having a pH less than 5, removing the acid clay from the oil, then treating the oil under substantially anhydrous conditions with fuller's earth having a pH greater than 8, removing any phosphatides present in the original oil prior to the treatment with alkaline fuller's earth, and finally removing the alkaline fuller's earth from the oil.

2. The process of producing non-break soybean oil which comprises first treating the oil with acid clay having a pH less than 5, removing the acid clay from the oil, then treating the oil under substantially anhydrous conditions with alkaline fuller's earth having a pH greater than 8, removing any phosphatides present in the original oil prior to the treatment with alkaline fuller's earth, and finally removing the alkaline fuller's earth from the oil.

3. The process of producing non-break soybean oil containing phosphatides which comprises treating the oil with acid clay having a pH less than 5, removing the acid clay from the oil, making an aqueous emulsion of the phosphatides, and separating the aqueous emulsion from the oil, thereafter treating the oil under substantially anhydrous conditions with alkaline fuller's earth having a pH greater than 8 and finally removing the alkaline fuller's earth from the oil.

4. The process which comprises treating phosphatide-containing vegetable oil miscella with acid clay having a pH less than 5, removing the solvent from the miscella, making an aqueous emulsion of the phosphatides, and separating the aqueous emulsion from the oil, recovering the phosphatides from the emulsion, treating the phosphatide-solvent free oil under substantially anhydrous conditions with alkaline fuller's earth having a pH above 8.0 only after removal of the acid clay, and separating the alkaline fuller's earth from the oil.

5. The process of claim 4 in which the oil miscella is soybean oil miscella.

6. The process of producing a non-break oil which comprises treating vegetable oil miscella with acid clay having a pH less than 5, removing the solvent from the miscella, removing the acid clay from the oil, then treating the oil under substantially anhydrous conditions with alkaline fuller's earth having a pH greater than 8.0, removing any phosphatide present in the oil prior to the treatment with alkaline fuller's earth and finally removing the alkaline fuller's earth from the oil.

7. The process of claim 6 in which the oil is soybean oil.

8. The process of producing a non-break oil which comprises treating a vegetable oil miscella containing phosphatides with an acid clay having a pH less than 5, removing the acid clay from the oil, removing the solvent from the miscella, making an aqueous emulsion of the phosphatides, and separating the aqueous emulsion from the oil, then treating the oil with alkaline fuller's earth having a pH greater than 8 and finally removing the alkaline fuller's earth from the oil.

9. The process of claim 8 in which the oil is soybean oil.

10. The process which comprises treating phosphatide containing vegetable oil miscella with acid clay having a pH less than 5, removing the solvent from the miscella, making an aqueous emulsion of the phosphatides, and separating the aqueous emulsion from the oil and recovering the phosphatides from the emulsion.

11. The process of claim 10 in which the miscella is soybean oil miscella.

PERCY L. JULIAN.
HERBERT T. IVESON.